United States Patent
Dominick (12) United States Patent (10) Patent No.: US 9,347,238 B2
(45) Date of Patent: May 24, 2016

(54) SHELTER LIFT ATTACHMENT FOR A PORTABLE HUMAN TRANSPORT SYSTEM

(71) Applicant: ERIPIO, LLC, Evansville, IN (US)

(72) Inventor: Damien H. Dominick, Clive, IA (US)

(73) Assignee: ERIPIO, LLC, Evansville, IN (US)

( * ) Notice: Subject to any disclaimer, the term of this patent is extended or adjusted under 35 U.S.C. 154(b) by 0 days.

(21) Appl. No.: 14/333,219

(22) Filed: Jul. 16, 2014

(65) Prior Publication Data

US 2015/0020857 A1 Jan. 22, 2015

Related U.S. Application Data

(60) Provisional application No. 61/847,063, filed on Jul. 16, 2013.

(51) Int. Cl.
| | | |
|---|---|---|
| E04H 15/04 | (2006.01) | |
| A61G 1/04 | (2006.01) | |
| A61G 1/00 | (2006.01) | |
| A61G 10/00 | (2006.01) | |

(52) U.S. Cl.
CPC ........ *E04H 15/04* (2013.01); *A61G 1/00* (2013.01); *A61G 1/04* (2013.01); *A61G 10/005* (2013.01); *A61G 2001/042* (2013.01); *B62B 2202/42* (2013.01)

(58) Field of Classification Search
CPC ........ E04H 15/02; E04H 15/04; A47C 29/00; A47C 29/003; A61G 1/04; A61G 2220/10; A61G 2201/042; B62B 2202/42
USPC ...................................... 135/90, 96
See application file for complete search history.

(56) References Cited

U.S. PATENT DOCUMENTS

| | | | | | |
|---|---|---|---|---|---|
| 613,865 | A | * | 11/1898 | Newton | 135/90 |
| 979,037 | A | * | 12/1910 | Searle | 135/90 |
| 2,544,977 | A | * | 3/1951 | Blank | 5/627 |
| 2,745,114 | A | * | 5/1956 | Cote | 5/627 |
| 2,880,427 | A | * | 4/1959 | Atwood | 5/627 |
| 3,545,461 | A | * | 12/1970 | Carlson | 135/90 |
| 4,198,996 | A | * | 4/1980 | Keable et al. | 135/128 |
| 4,320,542 | A | * | 3/1982 | Cohen | 5/121 |
| 4,526,307 | A | * | 7/1985 | Parker | 224/154 |
| 5,218,982 | A | * | 6/1993 | Kenji | 135/90 |
| 6,220,264 | B1 | * | 4/2001 | Newman | 135/90 |
| 6,338,356 | B1 | * | 1/2002 | Wallenstatter | 135/100 |
| 6,353,946 | B1 | * | 3/2002 | Steiner | 5/121 |
| 8,087,112 | B2 | * | 1/2012 | Cahaan | 5/625 |
| 8,220,197 | B1 | * | 7/2012 | Pray | 43/122 |
| 8,491,192 | B2 | * | 7/2013 | Brensinger et al. | 383/105 |
| 9,044,364 | B2 | * | 6/2015 | Dominick | |
| 2010/0237111 | A1 | * | 9/2010 | Mroczka | 224/156 |
| 2010/0252083 | A1 | * | 10/2010 | Ogle | 135/90 |
| 2010/0269874 | A1 | * | 10/2010 | Jacoby | 135/90 |
| 2011/0079259 | A1 | * | 4/2011 | Main et al. | 135/116 |
| 2012/0031448 | A1 | * | 2/2012 | Brensinger et al. | 135/121 |
| 2014/0020183 | A1 | * | 1/2014 | Dominick | 5/627 |
| 2014/0190537 | A1 | * | 7/2014 | Benda et al. | 135/92 |

FOREIGN PATENT DOCUMENTS

DE 10333633 A1 * 3/2005

* cited by examiner

*Primary Examiner* — David R Dunn
*Assistant Examiner* — Danielle Jackson
(74) *Attorney, Agent, or Firm* — Baxam Law Group, LLC; Deanna L. Baxam (57) ABSTRACT

A shelter configuration for a portable human transport system comprises a canopy attachment, optionally with a rain-fly closure, for protecting a casualty from inclement weather or external interference by pests or animals. The attachment enables aerial lifting or elevation of the patient in a fully enclosed transport system.

6 Claims, 7 Drawing Sheets

FIG. 7 ously owned International Patent
SHELTER LIFT ATTACHMENT FOR A PORTABLE HUMAN TRANSPORT SYSTEM This application claims the benefit of priority from U.S. Provisional Application No. 61/847,063, filed Jul. 16, 2013.

TECHNICAL FIELD OF THE INVENTION

The invention relates to a conversion attachment for a portable human transport system that is used by a single rescuer or multiple rescuers for immobilizing and transporting a patient or casualty in a field emergency setting. The portable human transport system may be used in circumstances where conventional emergency response vehicles and apparatus may be unavailable or impractical, such as in battlefield emergency field rescue operations or in emergency support and rescue of persons injured during outdoor wilderness activities in remote areas that are not accessible by medical transport vehicles. The present invention provides a fully enclosed transportation attachment for a portable human transport system by which a patient or casualty can be housed or air-lifted.

In addition to its utility for medical support in military field environments, the portable human transport system can be used in non-military rescue operations, such as in wilderness emergencies and for injuries from outdoor athletics. The invention is also useful in fire and disaster rescue scenarios to recovery the wounded or corpses. Qualities of durability, ruggedness, portability and adaptability for use in demanding conditions and environments are desirable for field equipment in combat situations, and are also desirable for equipment used in the evacuation of persons injured while engaged in wilderness or sports activities. These locations are not readily accessible by ambulances or vehicles which cannot travel over terrain without roads.

In such rescue conditions, the injured patient must first be stabilized so that any additional movement will not exacerbate the existing injury. In order to do this, it is desirable to have a means for immobilizing the patient prior to moving them to avoid causing further injury before they are moved any distance. Shelter may also be desirable to protect against the elements or to combat hypothermia. This invention may be used in combination with other elements of the portable human transport system to protect the patient or to maintain the patient in a stationary position.

BRIEF SUMMARY OF THE INVENTION

In one embodiment, the invention comprises a canopy or tent attachment for a portable human transport system having a litter element, in which the canopy is removably fixed to the litter element to allow lifting and movement of the fully enclosed system including the canopy.

In another embodiment, the invention comprises a portable field transport system that is configured as a tent or shelter for casualties.

In some embodiments, the invention comprises a canopy attachment that is self-framing, in that it is constructed to include flexible stiffening elements that frame the canopy without the need for a non-integral frame in order to keep the canopy elevated above the patient.

In other embodiments, the invention comprises a canopy attachment that is assembled over a non-integral frame and then attached to the litter element and an aerial suspension means.

In a further embodiment, the invention comprises a portable human transport system that includes a litter associated with a canopy to form an internal space for accommodating a patient or casualty, and further comprising one or more flaps allowing access to the internal space defined by the litter and the canopy.

In yet another embodiment, the invention comprises a portable human transport system comprising a litter element and a canopy that includes one or more windows comprised of a transparent material or air-permeable material that allows view access into the internal space formed by the litter and the canopy.

In a further embodiment, the attachment of the present invention comprises a canopy attachment with fastener means such as pull cords, straps, fabric hook and loop tape (e.g. VELCRO®) or snaps that affix the attachment to the litter of a portable human transport system.

In yet another embodiment, the attachment of the invention comprises a centrally positioned attachment point for connection to an aerial lift attachment of a machine or helicopter, or to a vertical or horizontal support.

DETAILED DESCRIPTION OF THE PREFERRED EMBODIMENTS

As used herein, the terms "patient" or "casualty" shall mean a wounded or injured person or other non-ambulatory person, or a corpse requiring transport from one location to another in a field emergency or wilderness rescue setting.

The present invention comprises a shelter attachment for use in conjunction with a portable human transport system such as is described in commonly owned International Patent Application Serial No. PCT/US13/74421 and in U.S. Non-provisional patent application Ser. No. 13/943,768. As described in those documents, a suitable system for transporting casualties in emergency field situations has multiple features, including a litter; at least one rescue harness for securing the litter element to the front or back of one or more rescuers; and a choke brake system removably connected to each rescue harness which arrests forward and rear oscillation and movement of the system when it is attached to the at least one rescue harness. The rescue harness of the portable human transport system comprises a three point harness assembly to immobilize a patient for transport by others, and in particular for a single rescuer to transport a patient. The choke braking system corresponds and communicates with the litter element and disrupts its arc of movement so as to reduce the impact of additional, uncontrolled movement on the patient being transported, and to reduce or minimize unnecessary movement or motion such as shifting, slippage or swaying of the stretcher, even if it is being transported by a single rescuer. The portable human transport system may be compactly folded for storage and transport; and its configuration allows for its transport and operation by a single user to transport a casualty or to provide a temporary shelter. In this respect, the system itself is convertible between a field stretcher, an aerial lift assembly, hammock, lean-to or tent.

The portable human transport system operates in one aspect as a field stretcher which may optionally be for "single-carry" of an injured person or casualty. In this respect, the system may be strapped at one end to the back of a single rescuer wearing a rescue harness assembly, with the upper body of the patient harnessed to a litter or stretcher element. The system may also be configured for transport by multiple persons. For example, in a "two-carry" configuration, two rescuers, each wearing a rescue harness, transport the patient suspended in a relatively horizontal, supine position between them upon the litter element. In this embodiment, the patient is transported between the rescuers, without dragging, at a height that is no lower than about the waist height of the rescuers. In other embodiments, the portable human transport system may be used to transport a seated patient by configuring the elements to form a fireman's cradle or seat for partially upright transport of a casualty. The present invention attaches to the litter after the patient has been positioned thereon.

More particularly, the portable human transport system comprises a frame for supporting a litter element that includes a pair of telescoping support poles connected to the edges of a flexible litter element. The poles are removable and may be alternately be used as crutches or as support poles for tent or lean-to shelter configurations of the system. Optionally, transverse, horizontal stabilizer bars that form part of the litter stabilization system may be incorporated with the telescoping poles to form the frame. The litter performs the function of supporting and/or shielding the body of the person being transported, while the attachment provides a fully enclosed canopy that protects the patient from the elements or unwanted ingress, and which can be hoisted or suspended aerially.

The attachment of the present invention expands the range of potential uses for the portable human transport system of the co-pending patent applications in the field. In certain embodiments, the invention provides a temporary emergency covering or shelter for a person awaiting transport or who is otherwise required to be laid in a supine position for the purpose of administering first aid. The shelter may also temporarily house corpses until recovery is possible. The attachment of the invention (FIG. 1) is collapsible and foldable and may be broken down and folded for storage or to be carried by rescuers along with the rest of the portable human transport system when not in use. The stored unit may also be folded and carried by hand as a roll or in a duffel bag. Alternatively, it may be strapped to the bearer's person or suspended from the shoulders like a ruck sack.

Figure 1:
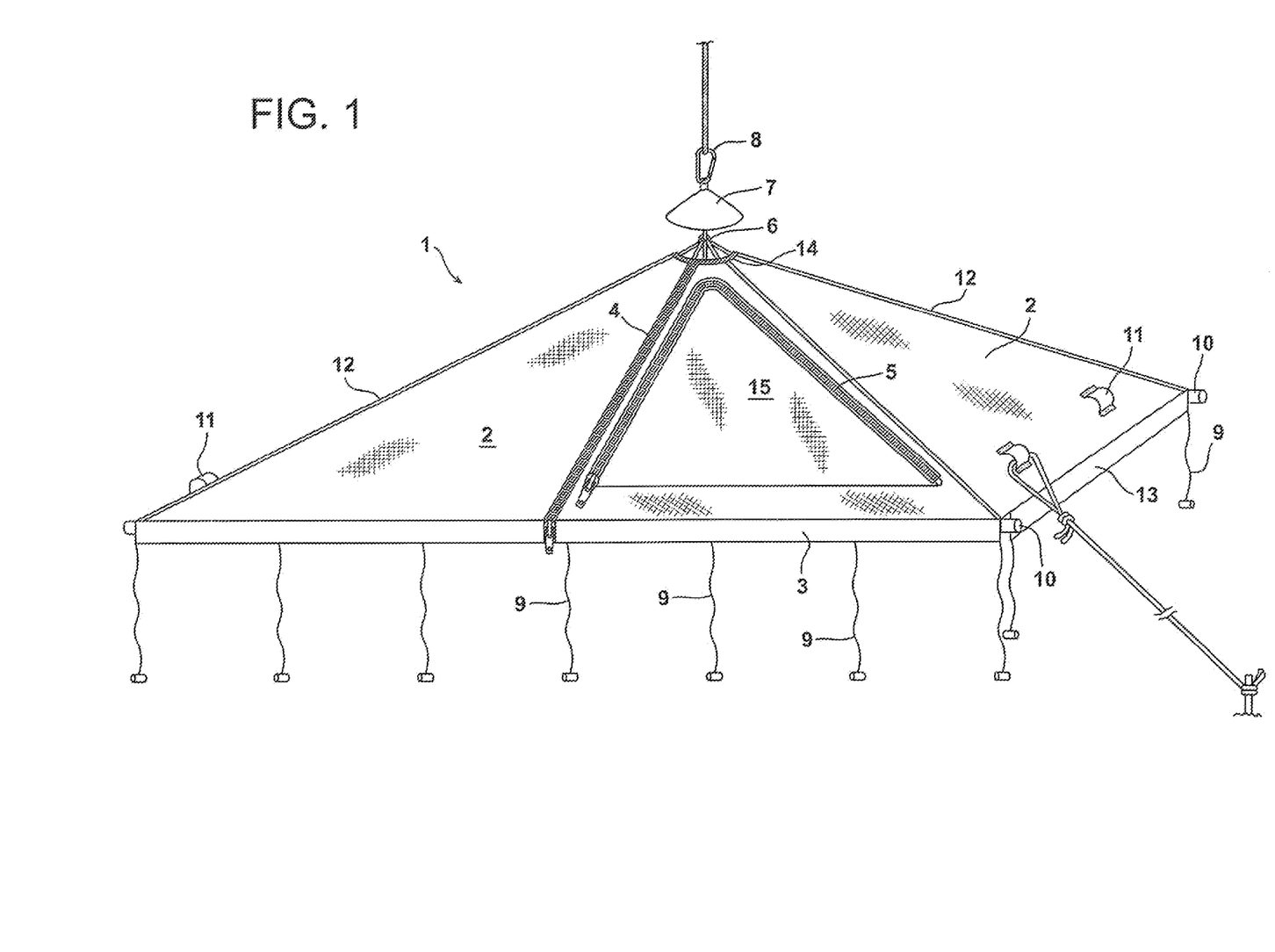
FIG. 1 is a perspective view of a portable human transport system assembled with the attachment of the invention having an integral canopy frame.

According to FIG. 1, a support frame for the litter comprises two collapsible telescoping poles 10 positioned in parallel that accommodate each side of a litter element 100. Each of the poles is comprised of adjacently positioned segments which are insertably related one to the other in series. The litter further includes pole sleeves 3, or alternatively, folding tabs (not shown) to secure the poles 10 to the litter 100. When used, the tabs may be folded over the poles and fastened to form loops for the poles.

The foldable litter element 100 also includes stabilizer bars 13 at the ends thereof. The combination of telescoping poles 10 and stabilizer bars 13 provides a rigid frame for secure transport, weight-bearing and even distribution of the patient's body weight. Because the frame can be broken down into small pieces and compacted for storage, the system of the invention is very amenable to convenient field use. Regarding the end stabilizer bars, each may be equipped with slots (not shown) sized to hold the width of stabilizer bar restraint straps, which are passed through the slots and looped over the bar before being fastened. The fastener means may be corresponding snaps or reclosable hook and loop fabric closure (VELCRO®) attachments. These form secure loops that hold the bar in place. In addition, pockets may be disposed at each corner of the litter itself to receive the ends of the stabilizer bar and to keep it from slipping out of the loops. Similar attachment mechanisms such as pockets, straps and sleeves may attach the poles to the litter. Examples of embodiments comprising pole straps and end stabilizer bars with slots and pocket loops are disclosed in more detail in the co-pending applications, e.g. U.S. Nonprovisional patent application Ser. No. 13/943,768.

Figure 2:
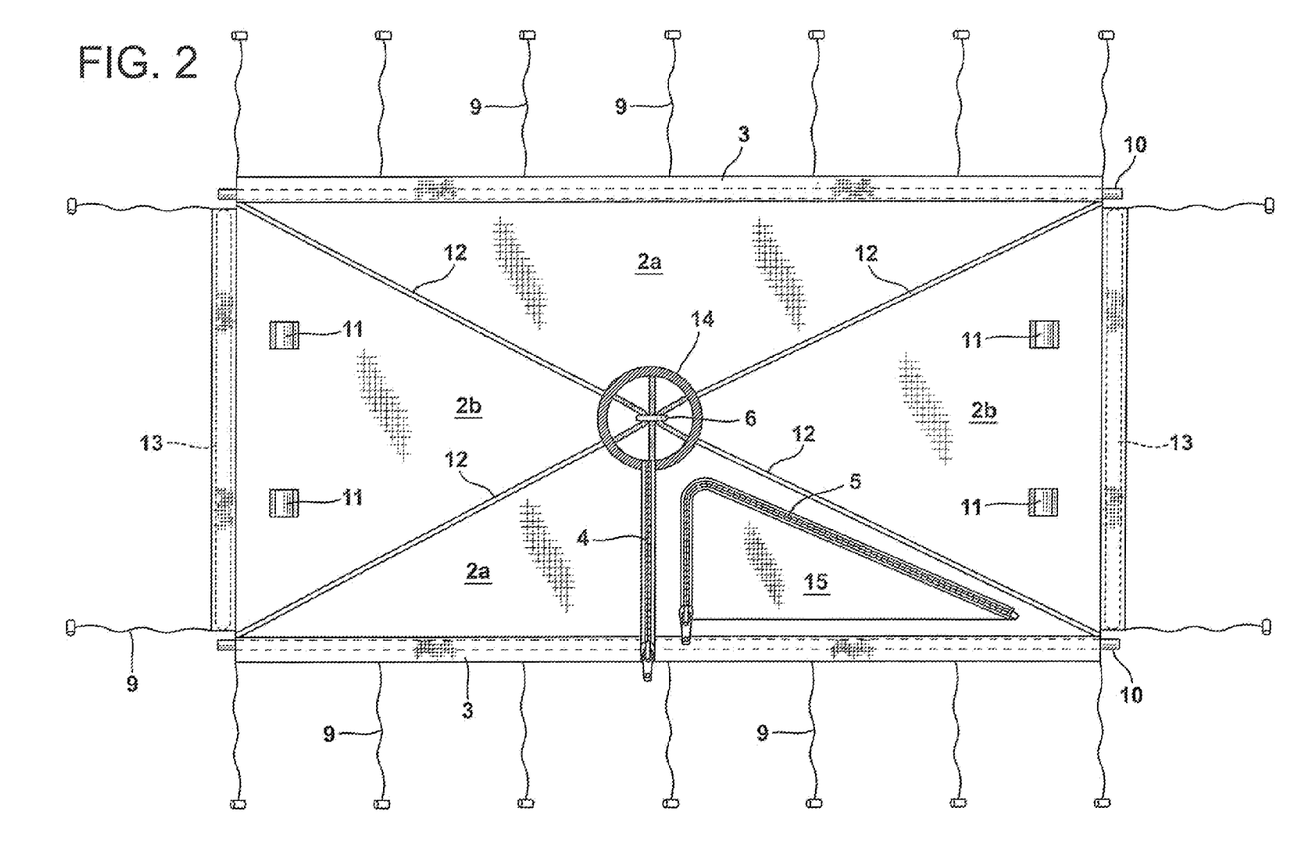
FIG. 2 is a planar, top aerial view of the invention attached to the litter assembly of the portable human transport system.
Figure 3:
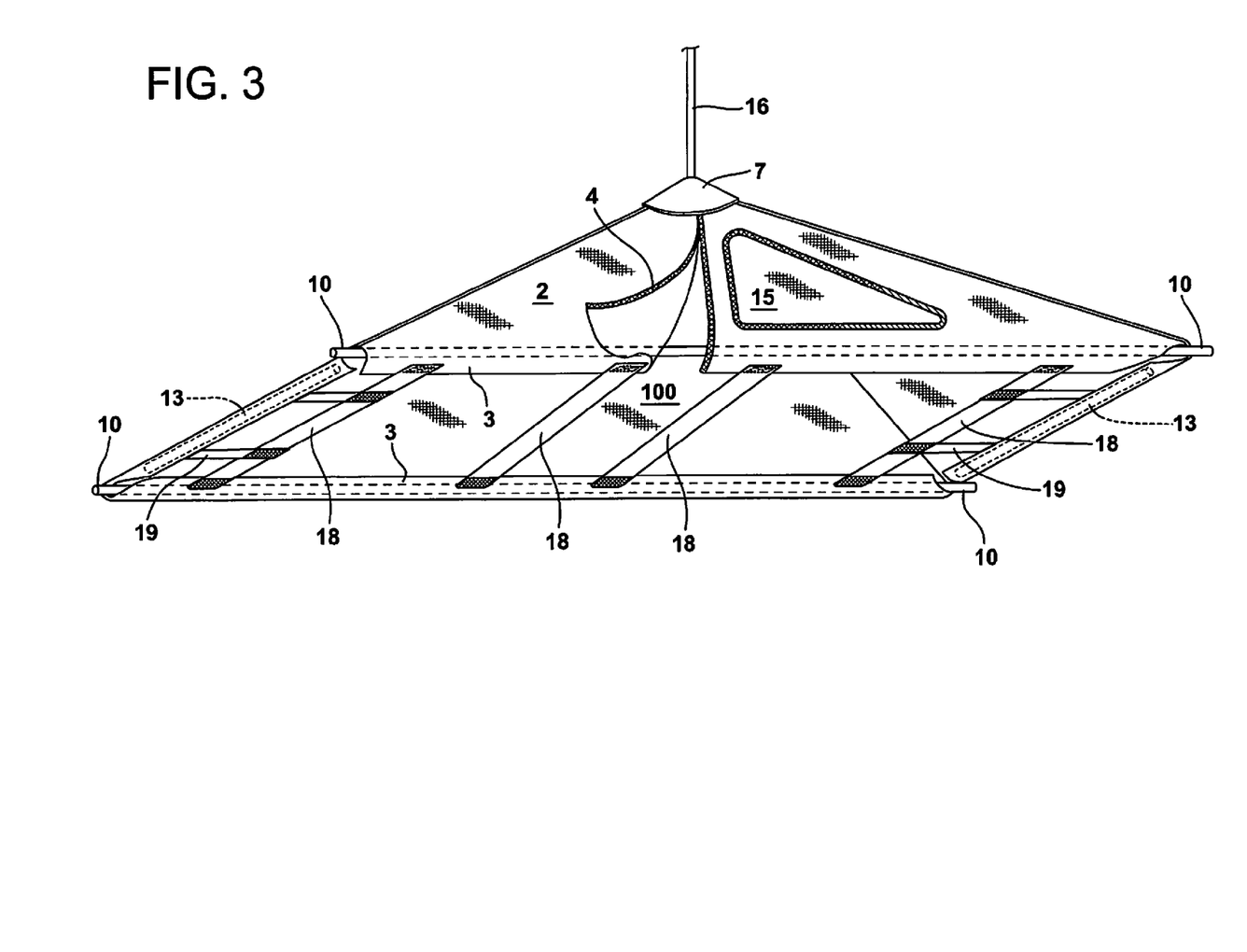
FIG. 3 is a perspective view showing the underside of the invention.

Preferably, as shown in FIG. 2, the sewn panels of the canopy 1 include two long sides 2a and two short sides 2b, which conform to the dimensions of the litter and accommodate the average height of most patients. On one side of the long sides 2a, a zipper 4 is located which allows for the panels of the canopy to be joined together to form the closure after the portable human transport system is fully erected. As shown in FIG. 3, closure of the zipper 4 serves as the final step in sealing the canopy over the patient or casualty after the system has been assembled and the body loaded.

In certain embodiments and as seen in FIG. 1, the invention additionally comprises a triangular shaped, access flap 15, which is opened via a zipper 5. This access flap serves as a point of access into the fully assembled litter-canopy system. This flap 15 may be made of the same material as the rest of the canopy, or it may be made of a different material such as transparent plastic or mosquito netting.

Disposed within an apex aperture 14 of the canopy is preferably a bezel ring 6 connected to the suspension assembly of the canopy 1. In this regard the ring may connect with the integral frame elements or with non-integral suspended frame elements. The aperture 14 is co-terminal with the end of the zipper 4. In preferred embodiments, the aperture 14 is covered by a "rain-fly" assembly 7 which shields the apex and the insides of the tent assembly from the entry of water or snow. In this regard, a strip of VELCRO® material is attached to the circumference of the aperture opening 14. A reciprocal VELCRO® strip is attached to the circumference of the rain-fly attachment 7. The reclosable hook and loop fastening so created secures the rain-fly attachment when it is contacted with the apex aperture.

The apex aperture 14 also allows access to the connection point of the canopy's suspension system, which may for example be a heavy duty steel bezel ring 6. The ring 6 serves as the point of connection to a horizontal support if the portable human transport system is to be suspended and non-mobile; and it also serves as the connection point for attachment to an aerial lift apparatus such as a hook or winch dropped from an airborne vehicle. This allows the system to be picked up by a helicopter or other aerial transport means.

As seen in FIG. 1, embodiments of the invention may further include attachment means for securing the portable human transport system and canopy at or near ground level. In this respect, sewn to the outside of the canopy 1, for example on the short side panels 2b, are included nylon loops 11. The loops 11 are sized to accommodate lines or lanyards and affixing, and these lines may be secured to a point of contact. When used in this manner, the loops 11 help to arrest and reduce the swinging motion of the litter shelter while it is suspended or being transported.

The patient supporting surface of the litter element comprises one or more adjacently located, folded panels, each of which may be attached and/or folded at an angle in relation to the other; and one or more carry loops, fasteners and/or casualty straps for securing a patient. In one such preferred embodiment, the litter element comprises a single, stacked panel of layered fabrics folded to form a center panel that is contiguously formed with and flanked by two end panels connected to the center panel along the fold lines. Either the center panel or one of the end panels may be used as the primary patient contact surface of the stretcher, in which case the other two elements may be folded under or over the transport base. Various fasteners may be incorporated around the edges of the folded litter or at the corners thereof, such loops, sleeves or tabs with fasteners such as reclosable snaps or fabric hook and loop tape. Carry loops 17 (FIG. 4) may be affixed to the corners of the center or end panels such that they may be used to lift the stretcher. The carry loops may be constructed from heavy duty nylon fabric or rope, or other suitable materials. In addition, casualty restraint straps and loops to accommodate these may be affixed at various intervals around the edge of the litter. The casualty restraint straps are secured around the patient's body to prevent shifting. With respect to the size of the litter element, the dimensions of each panel are selected to be of sufficient length and width to provide a litter that can accommodate various body sizes, with each panel being of approximately equivalent dimensions having the length greater than the width.

As previously mentioned, the litter element itself may be composed from one or more layers of fabric having different characteristics that add to the functional suitability of the transport system for various applications, or any combination thereof. Each panel may further be comprised of layers of fabrics selected from materials that are porous, breathable, washable, insulating and reflective fabrics, or combinations thereof. For example, the outermost layers of the end panels in relation to the casualty's body may be made of camouflage print fabric or a reflective material that serves the purpose of signaling search and rescue teams and military transport pick-ups. Examples of suitable materials may be selected from durable, reinforced fabrics (e.g. CORDURA®) nylon, canvas, nylon, polyester, polytetrafluoroethylene fabric (TEFLON®), polyamides, plastic, rubber, or combinations of these. For example, a durable fabric such canvas may be combined with other fabrics that may optionally be specifically colored or coated with a functional coating such as paint or dye, or with layers that possess waterproofing properties, or with thermal layers designed to enhance warming or cooling. In certain embodiments, the litter may be constructed of upper layers of CORDURA® and an under-paneling of canvas that is sturdy, resistant and less expensive. Other properties common to materials used in outdoor exposure or rescue conditions may also be contemplated. An external layer of the litter element may also be printed or otherwise affixed with graphics, text, emergency messaging, instructions, logos or brand information. The outer edges of each panel may be sewn, glued or bonded to be stable and durable. In a preferred embodiment, the litter element is formed from a single 90×90 inch (15 square feet) panel made of two layers of CORDURA®, one in military fatigue green and the other colored blaze orange. This large square panel is folded, for example in accordion-like (Z-fold) fashion, and fastened on itself to form a 90×30 inch litter element. This rectangular shape is formed from folding of the square panel to form top, middle and lower panels. This can be achieved because the configuration of each panel includes a series of straps and fasteners that are positioned so that when correctly fastened, the precise, desired configuration of folded panels is obtained. The upper and lower panels are identical in size and configuration, thus enabling either end of the panels, when folded, to serve as the head or tail of the litter element. This allows the portable transport system to be oriented in either direction to accommodate a casualty. The layers may also be constructed of different materials.

Figure 7:
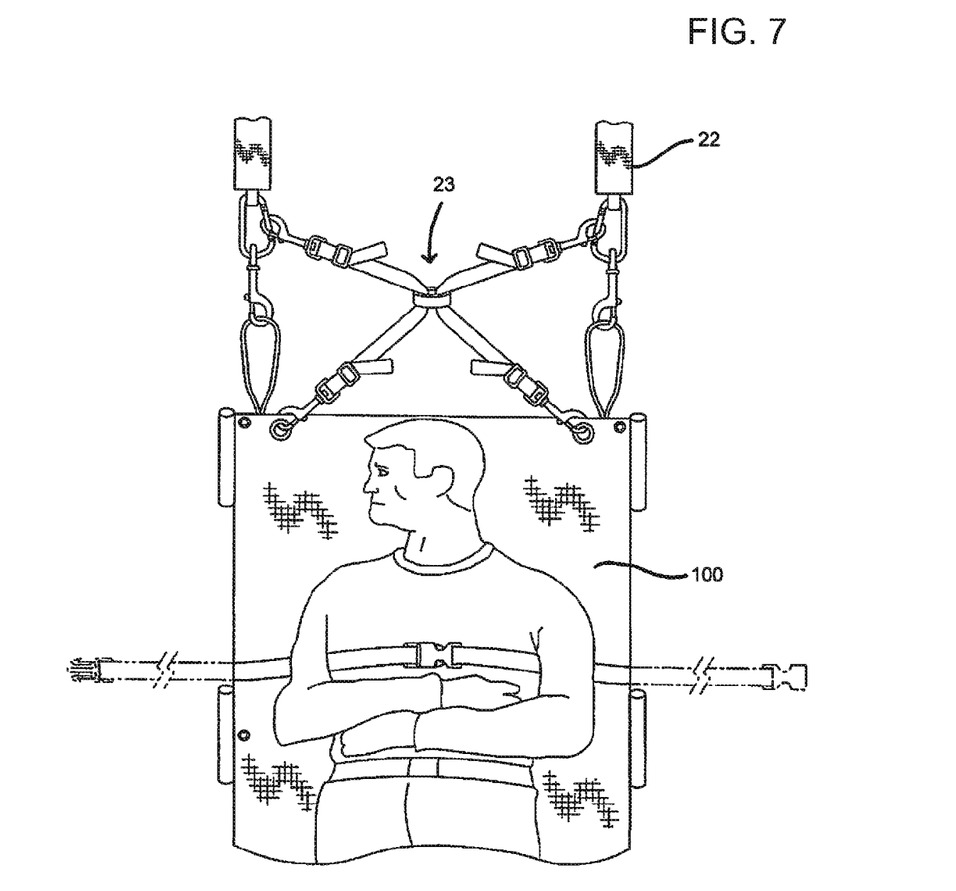
FIG. 7 is a planar view of a portable human transport system configured with a choke brake system attached to the litter element of the invention and to the ends of a rescue harness.

As shown in FIG. 7, rescue harness of the portable human transport system has loops that can accommodate, for example, a lanyard for IV or other medical tubing, lead wires for electrocardiographic measurements or cords for a power source connected to a wearable medical pump. The rescue harness 22 may be connected at one end to the litter bearing the patient and may be further connected to a choke braking system 23 which stabilizes the litter 100 while it is being transported. Such tubing or wires may remain connected to the patient inside the transport system while being accessible for monitoring through the window flaps.

The choke braking system, in its operation, interrupts the natural arc of motion through which a suspended object, in this case the litter element, would otherwise move in unimpeded range of motion. The braking system of the invention comprises a bezel ring for accommodating a number of adjustable straps. The straps are passed through the bezel ring and connected at one end to the grommets located near the edge of the topmost litter panel (or to the single litter panel if the litter element is not made up of folded panels). The other end of each bezel strap is connected at the other end to the corresponding harness loop at the end of the rear harness strap that is removably fastened to a litter panel so as to permit lifting, pulling or dragging of the litter. In operation, as the litter is being moved, the bezel ring moves backwards or forwards in dynamic response to the drag exerted on the bezel straps by the lateral sway of the litter. The ring exerts a counter pressure that shortens the range of motion of the bezel straps, thereby minimizing the undesirable sideways movement of the litter element.

As is further shown in FIG. 1, the litter is configured for aerial lift by using the telescoping side poles 10 to create a frame for the sides of the litter, and further attaching the stabilizer bars at the ends to create a rigid frame all around the litter. As indicated by FIGS. 1 and 2, the canopy attachment 1 may be fashioned with internal reinforcement along fold lines 12 to provide an integrally framed canopy structure. The integral frame material may be a flexible ribbing or other foldable stiffening element. This bendable stiffening element provides framing, elevation and an integral frame structure for the canopy when it is erected, but also allows it to be folded for compact storage.

Figure 4:
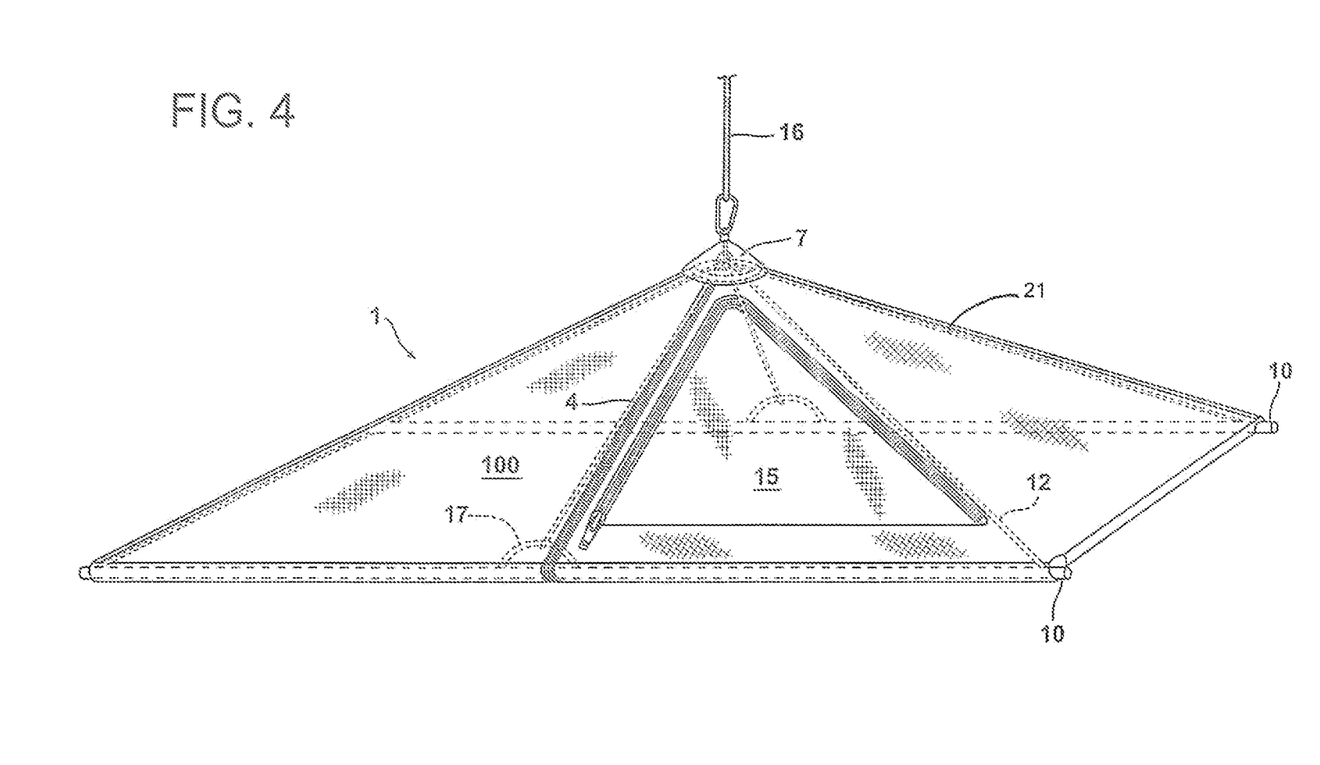
FIG. 4 is a transparent, perspective view of the invention showing a non-integral canopy frame and attachment to a litter element.
Figure 5:
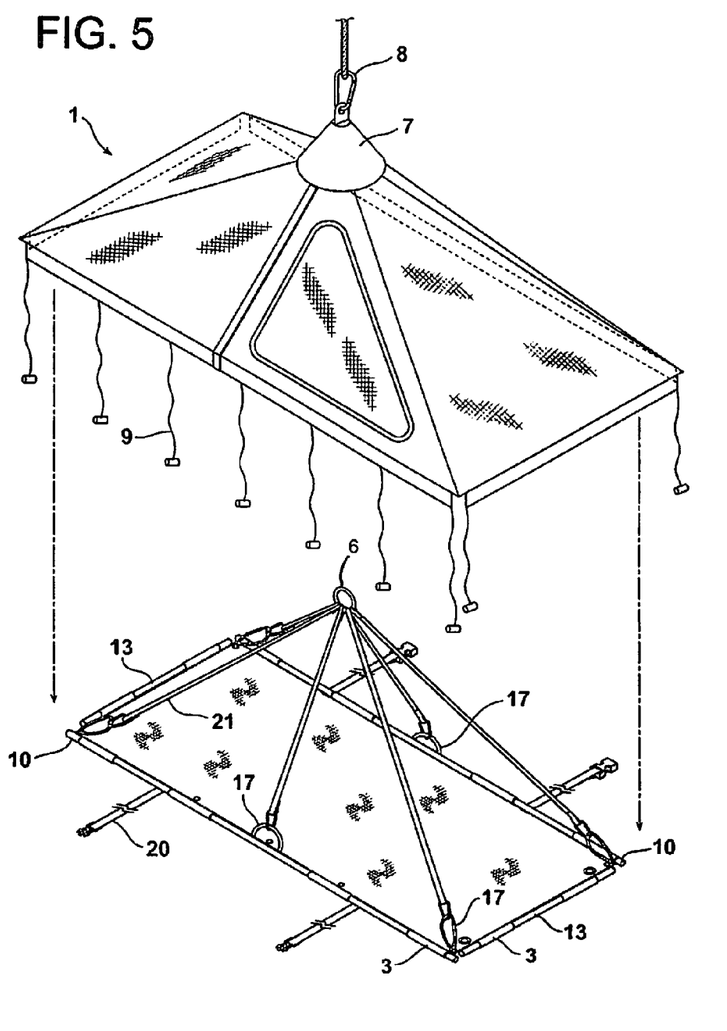
FIG. 5 is an exploded, perspective view of the invention and a non-integral canopy frame.

In other embodiments as exemplified by FIGS. 4 and 5, a system of fixed length straps, strong lines or ropes 21 are suspended to create a non-integral canopy frame and attached at the attachment point 6. The frame is achieved by running straps (or ropes or lines) 21 from the frame to a centrally located attachment point 6, such as a heavy duty steel bezel ring. Once the suspended frame is assembled the canopy attachment 1 is lowered onto and secured over the non-integral canopy frame to form the erected structure, the canopy is wrapped around the litter element so framed (FIG. 5). In such embodiments, the frame is maintained erect by the underlying non-integral suspension frame system rather than by any integral stiffening in the canopy attachment.

Once the canopy attachment is assembled, the attachment point 6, e.g. a bezel ring, may then be affixed to a rope or line 16 (FIGS. 1 and 4) extended from a horizontal support or an aerial lift assembly of a vehicle for secure transport.

Figure 6:
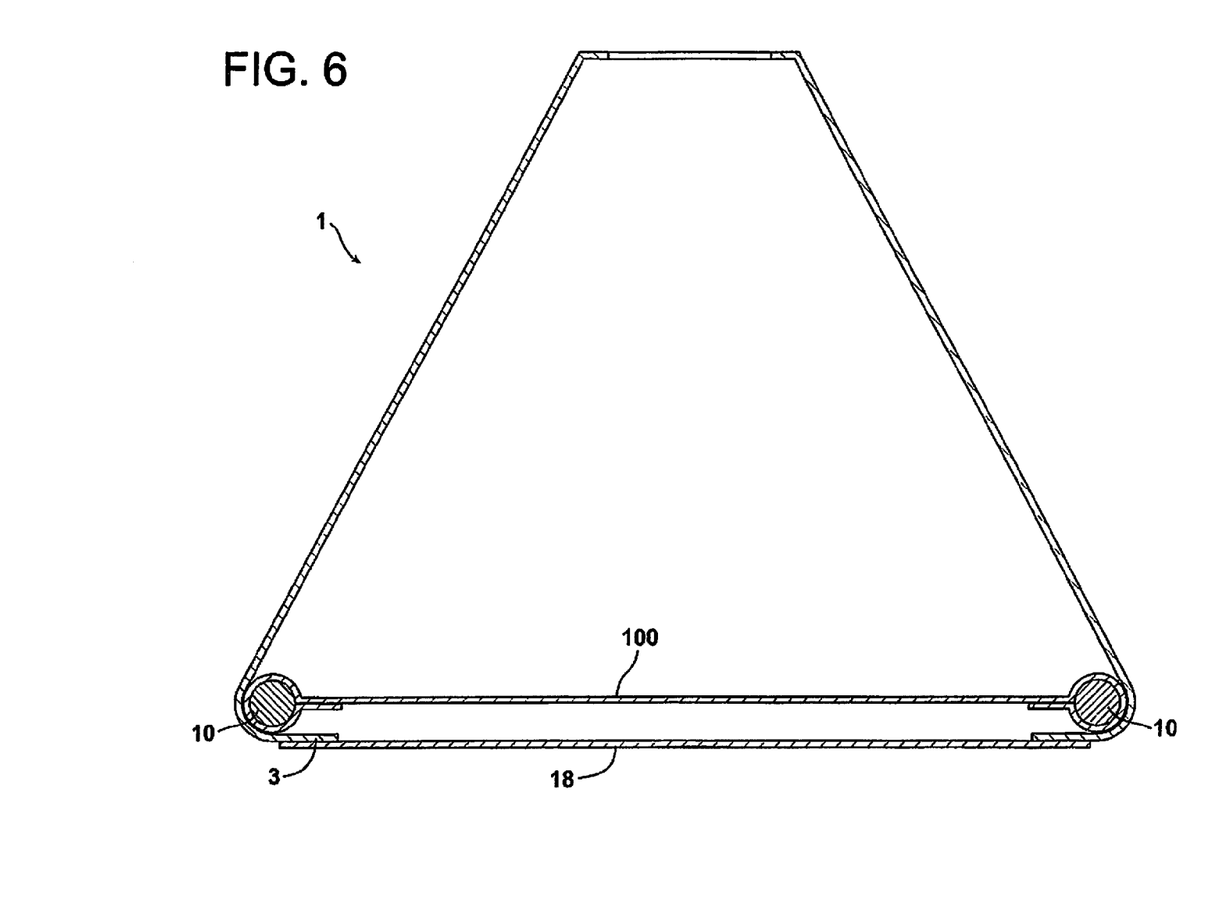
FIG. 6 is a cross-sectional end view of the portable human transport system of the invention showing the attached canopy element to the litter element.

The canopy attachment 1 may be constructed of waterproof, rip-stop tent canvas and sewn into panels which generally correspond to the lengths and angles created by the frames of the fixed length strap system of the aerial lift assembly. Materials such as are used for construction of the foldable litter element may also be used. The canopy is manufactured to have an overlap of material along the bottom and short sides. This overlapped material is folded over the telescoping side poles and stabilizer bars of the portable human transport system and secured. A suitable fastener means includes drawstrings 9 (FIGS. 1 and 2) stretched across and attached to one another, in the manner of bungee cords, under the litter. Alternatively, as shown in FIG. 3, the fasteners may be straps 18 that attach, for example, by reclosable fabric hook and loop closures such as VELCRO®) underneath the litter element 100. According to FIG. 6, the fasteners 9, 18 extend from the lower edges of the canopy 1 and overlap the edges of the litter to which the telescoping poles and stabilizing bars are attached. This overlap is wrapped around and the poles 10 and end stabilizing bars 13, respectively and then fastened to completely secure the canopy 1 to the litter 100. This attachment of the canopy to the litter element of the portable human transport system creates a complete enclosure along the bottom of the suspended litter to keep out pests like insects and reptiles. It further secures the body and enables the litter to serve as a floor if the litter is suspended at ground level or is air-lifted.

A suspended configuration of the portable human transport system with the shelter attachment of the invention permits use in rocky, wet areas or areas with dangerous pests like scorpions, to shelter the casualty safely and comfortably. This shelter configuration can however also be implemented on the ground.

INDUSTRIAL APPLICABILITY

In addition to its value in the military theater as an efficient rescue apparatus and support for first aid measures, the invention may be used in fire rescue and disaster search, rescue and recovery operations. The invention also finds applicability as a rescue device in the field of extreme sporting activities where injuries in remote locations are possible.

The foregoing description of specific embodiments is not intended to be limiting on the scope of this disclosure, but rather to be illustrative of the broad concepts embodied by this invention. Those skilled in the art will appreciate that the present invention contemplates the various embodiments of the invention herein described as well as equivalents thereof. However, those skilled in the art will also appreciate that the scope of this invention should be measured by the attached claims as well as by the specific embodiments identified.

The invention claimed is:

1. A portable human transport system comprising a foldable litter element that includes four side edges; a choke brake system attached to the litter element, comprising a bezel ring and straps; and a collapsible canopy of dimensions that approximately correspond to the dimensions of the litter element when it is assembled, which includes: a center point thereof; an attachment point located approximately in at the center point that connects with a horizontal support or aerial lift assembly; long and short side panels attached together by seams and supported by a canopy frame to form a structure with an elevated region in the center thereof corresponding to the attachment point and an opening opposite the elevated center region, and which has two long side edges and two short side edges; a zipper closure; a pair of loops attached to each short side panel, wherein the loops may be attached to lines secured to a point of contact to arrest the swinging motion of the apparatus while it is suspended; a series of fasteners, selected from straps or reclosable hook and loop fastener tapes, that attach the long and short side edges of the canopy to the four side edges of the litter element; and a rain-fly assembly covering the attachment point; wherein the litter element further comprises two removable telescoping poles, each positioned in parallel, and two transverse stabilizer bars attached to the ends of the telescoping poles, to form a rigid frame for the litter element that can be broken down into small pieces and compacted for storage, wherein the telescoping poles are attached to the long side edges of the canopy.

2. The portable human transport system of claim 1 wherein the collapsible canopy comprises flexible ribbing material incorporated in the seams.

3. The portable human transport system of claim 1 further comprising one or more flaps or windows.

4. The portable human transport system of claim 1 wherein the canopy is constructed from a material selected from the group consisting of durable high-tenacity fiber fabric, nylon, canvas, polyester, nonstick polytetrafluoroethylene-coated fabric, polyamides, plastic, rubber and combinations thereof.

5. The portable human transport system of claim 1, the canopy further comprising outer layers selected from camouflage print fabric or a reflective material.

6. The portable human transport system of claim 1, wherein the system provides a fully enclosed system for suspended housing or aerially transporting patients or casualties.

* * * * *